United States Patent [19]

Chen et al.

[11] Patent Number: 5,157,666

[45] Date of Patent: Oct. 20, 1992

[54] DISK TIMING DIAGNOSTIC

[75] Inventors: Daniel C. Chen, Webster; Mark A. Smith, Rochester, both of N.Y.

[73] Assignee: Xerox Corporation, Stamford, Conn.

[21] Appl. No.: 587,826

[22] Filed: Sep. 24, 1990

[51] Int. Cl.$^5$ ............................................. G11B 20/18
[52] U.S. Cl. ................................................. 371/21.1
[58] Field of Search ........................ 371/21.1; 369/53; 360/78.04

[56] References Cited

U.S. PATENT DOCUMENTS

| | | | |
|---|---|---|---|
| 4,103,338 | 7/1978 | Cizmic et al. | 371/21.1 X |
| 4,564,864 | 1/1986 | Maeshima | 358/280 |
| 4,731,673 | 3/1988 | Yamakawa | 358/300 |
| 4,870,643 | 9/1989 | Bultman et al. | 371/11.1 |
| 4,907,109 | 3/1990 | Senio | 360/78.04 |

Primary Examiner—Stephen M. Baker
Attorney, Agent, or Firm—Ronald T. Chapuran

[57] ABSTRACT

A method for testing and comparing the access times of disk drives in a real time system containing a multiplicity of likes drives. The method includes the steps of generating random locations for each of the drives to access, initializing each of the drives to a common position, determining the time period for each of the drives to find and read the random locations, comparing the differences in the time periods to a threshold value, and declaring a fault upon detecting any of the differences exceeding the said threshold.

12 Claims, 9 Drawing Sheets

DISK TIMING DIAGNOSTIC

BACKGROUND OF THE INVENTION

The invention relates to real time systems diagnostics, and more particularly, to a technique for analyzing the response time of a plurality of disk drives for such machines.

The need to process vast quantities of information has become much more crucial as electronic imaging machines become more complex and versatile. The necessity of processing large blocks of data can be very important to the efficient operation of the machine. This can be particularly important in retrieving and printing data from a plurality of disk storage devices sharing portions of the information to be processed. In a real time system, access times of disks must be predictable to insure that data is read correctly. Storage devices that are not predicted accurately can result in erroneous or garbled data being retrieved, stored, or printed.

The prior art includes U.S. Pat. No. 4,870,643 to Bultman et al. discloses a parallel drive array storage system which includes five disk drives, a formatter for each drive, and a master controller. The spindles of each drive rotate in synchronism to improve data handling. Information is routed successively to the first four drives, while the fifth drive has parity check information. The system is capable of running even if one of the drive units fails. Various low level diagnostics are available for determining faults. Synchronization of the drives is accomplished by a spindle reference counter which provides an index pulse to each individual drive for controlling its rate of rotation. See Col. 18, line 41 through Col. 20, line 58.

U.S. Pat. No. 4,731,673 to Yamakawa discloses an image output device which has a plurality of memories, each capable of reading and writing parallel data, a data reading instruction means, and a plurality of dot forming means. A clock signal is used for parallel transfer of image data between the plurality of memories.

U.S. Pat. No. 4,564,864 to Maeshima discloses an image forming apparatus capable of accurately recording image input information and driving plural recording units simultaneously even when a recording unit is not synchronized with the input information.

A difficulty with the prior art systems is that the systems are often simply redundant systems or only tested memory drives individually rather than in relation to one another or are directed to the recording of information rather than to synchronized retrieval from a plurality of memories for printing.

It is an object, therefore, of the present invention to test the retrieval of data from a plurality of disk memories in relation to one another against a threshold value to uncover a relatively slow drive response. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is a method for testing and comparing the access times of disk drives in a real time system containing a multiplicity of like drives. The invention includes the steps of generating random locations for each of the drives to access, initializing each of the drives to a common position, determining the time period for each of the drives to find and read the random locations, comparing the differences in the time periods to a threshold value, and declaring a fault upon detecting any of the differences exceeding the said threshold.

For a better understanding of the present invention, reference may be had to the accompanying drawings wherein the same reference numerals have been applied to like parts and where.

DETAILED DESCRIPTION OF THE DRAWINGS

DETAILED DESCRIPTION OF THE PREFERRED EMBODIMENT

Figure 1:
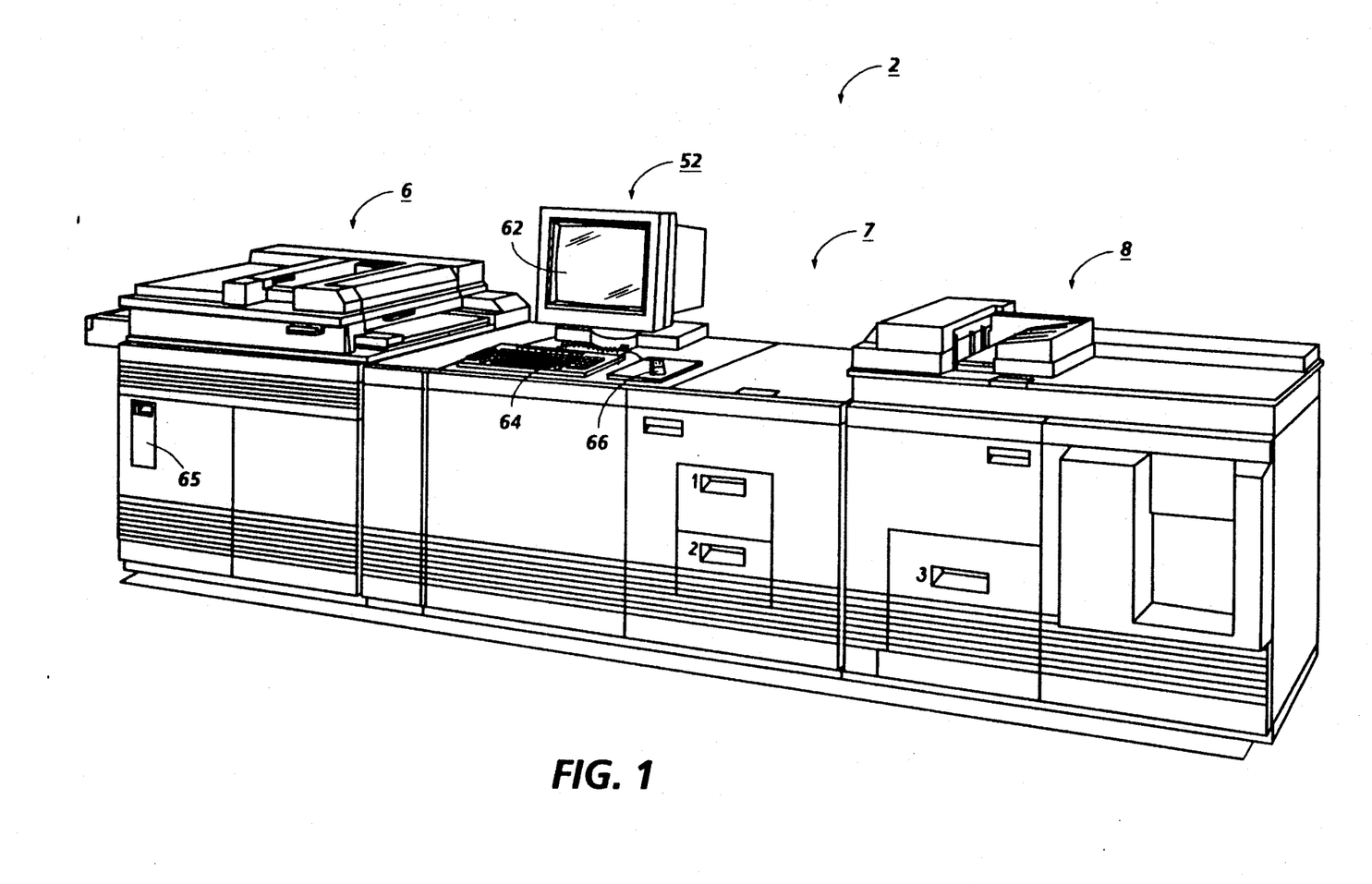
FIG. 1 is a view depicting an electronic printing system with the job supplement of the present invention allowing building of print jobs from diverse inputs or in response to special programming instructions.
Figure 2:
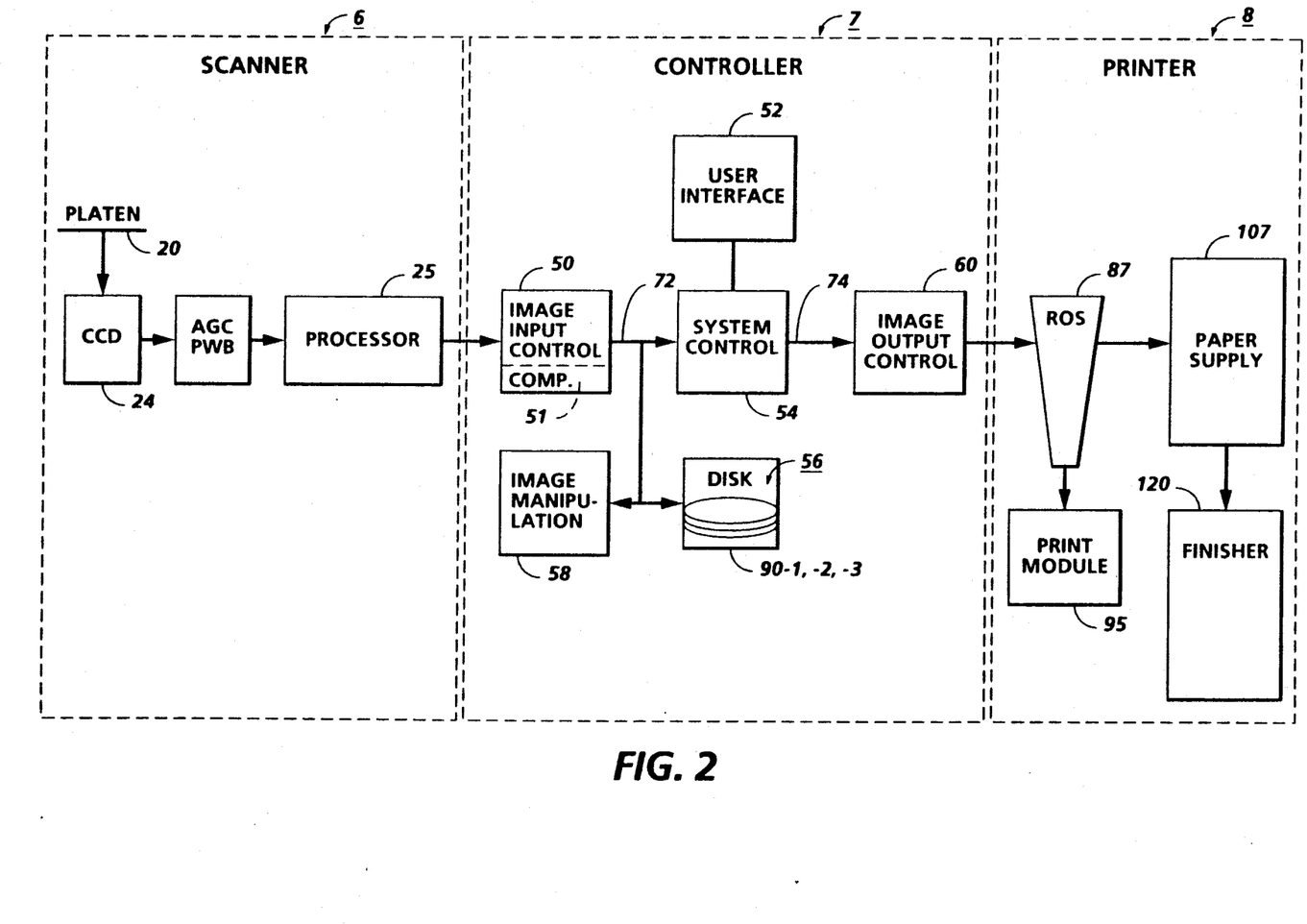
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
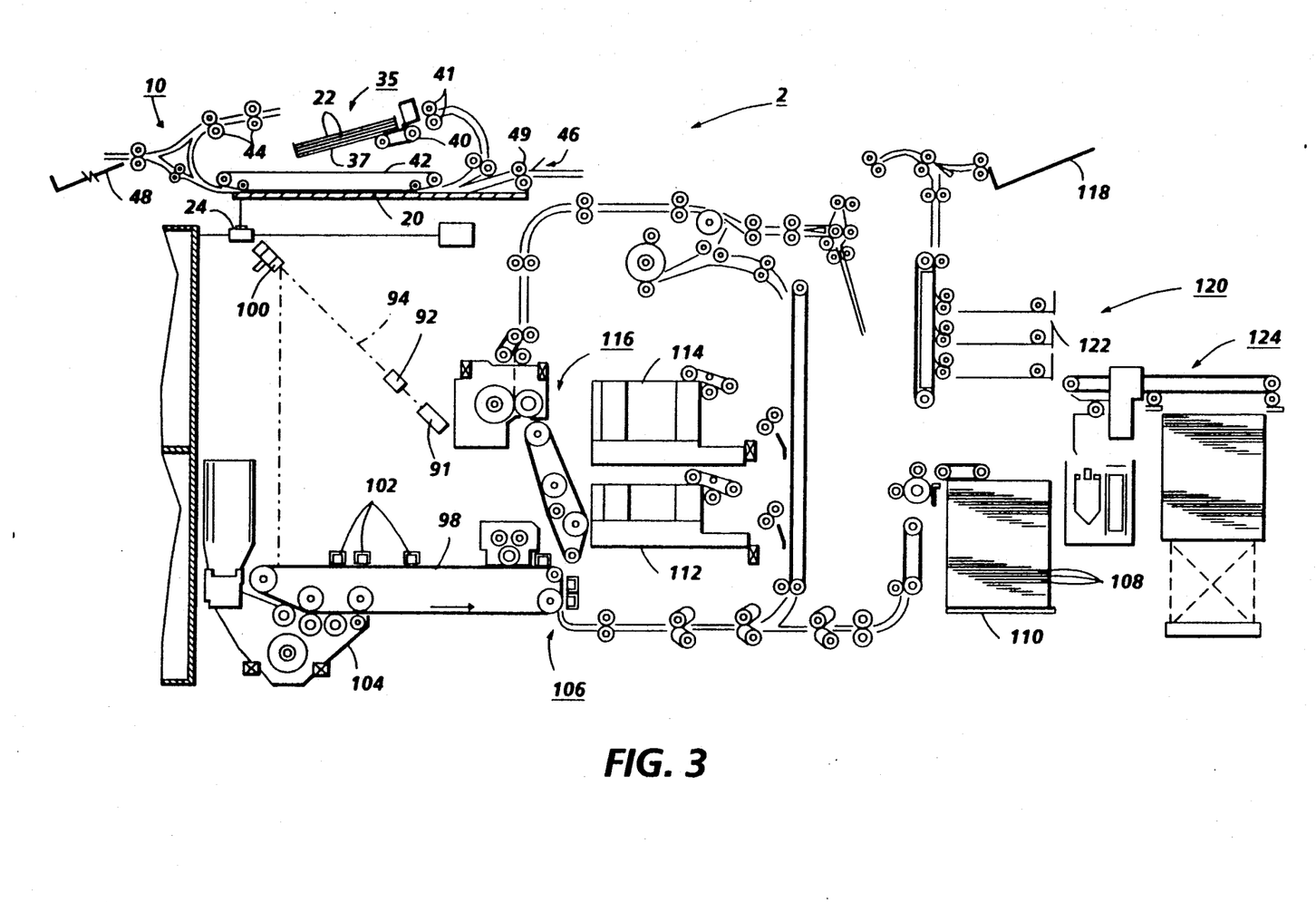
FIG. 3 is a plan view illustrating the principal mechanical components of the printing system shown in FIG. 1.
Figure 4:
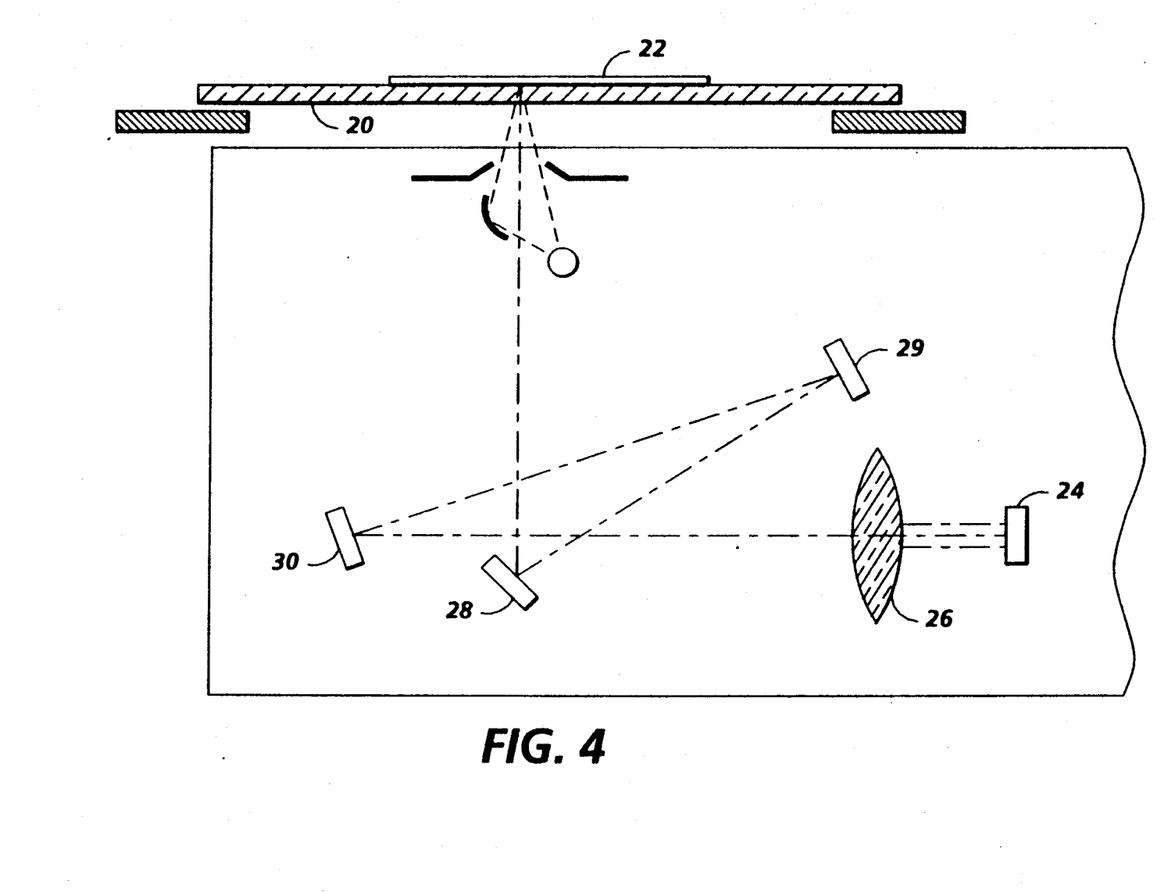
FIG. 4 is a schematic view showing certain construction details of the document scanner.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF)

mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5A:
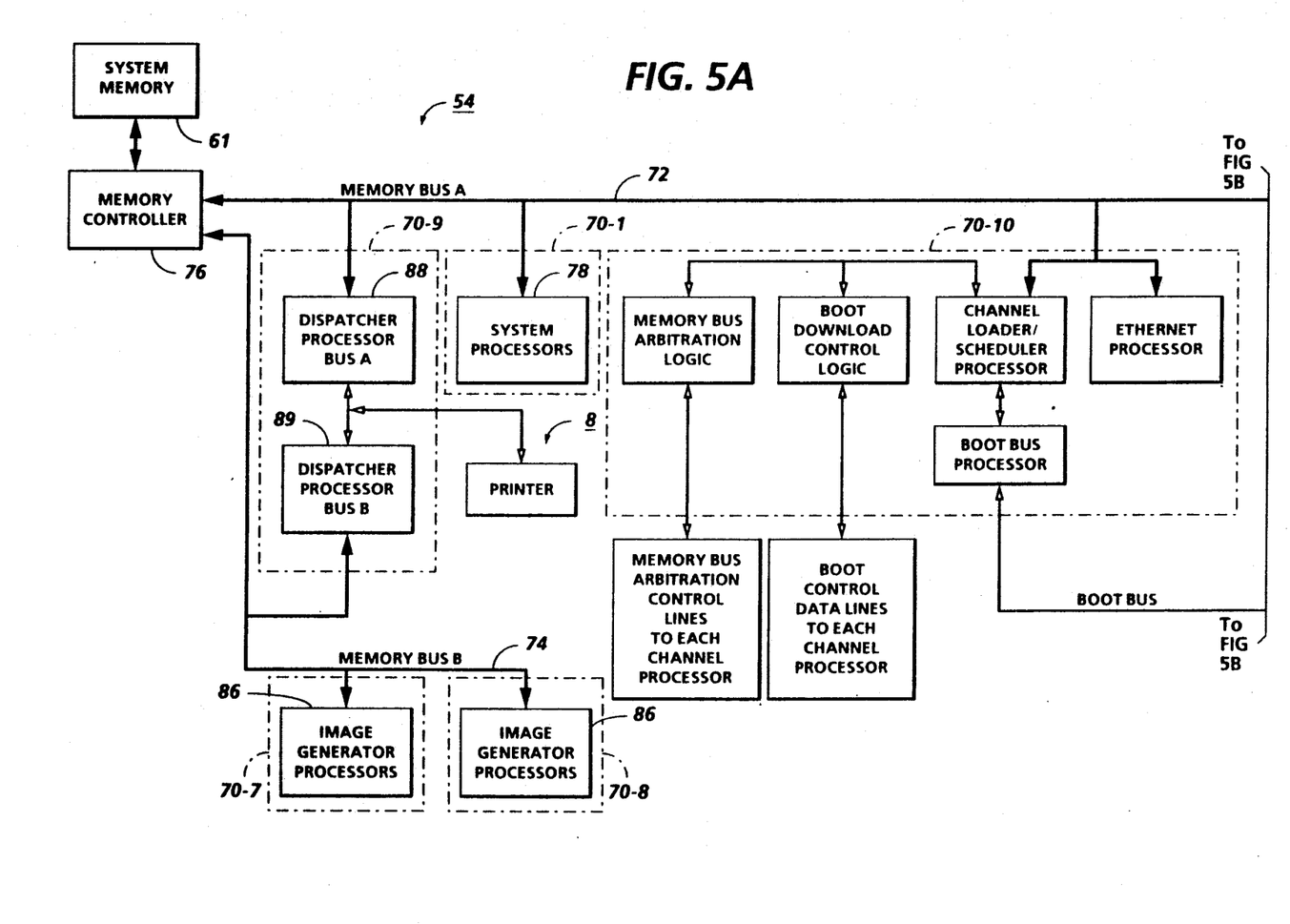
FIGS. 5A, 5B and 5C comprise a schematic block diagram showing the major parts of the system control section.
Figure 5B:
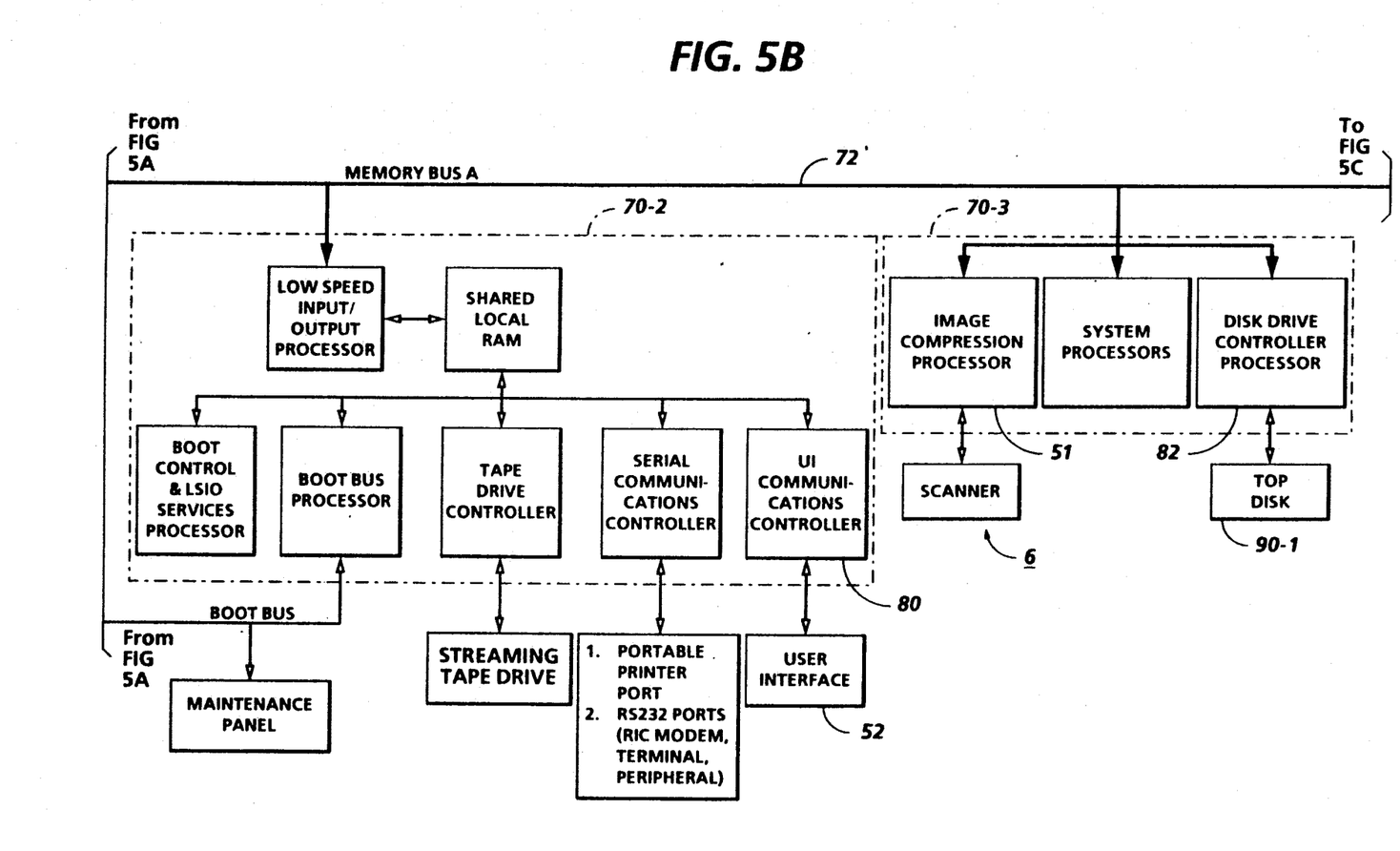
Figure 5C:
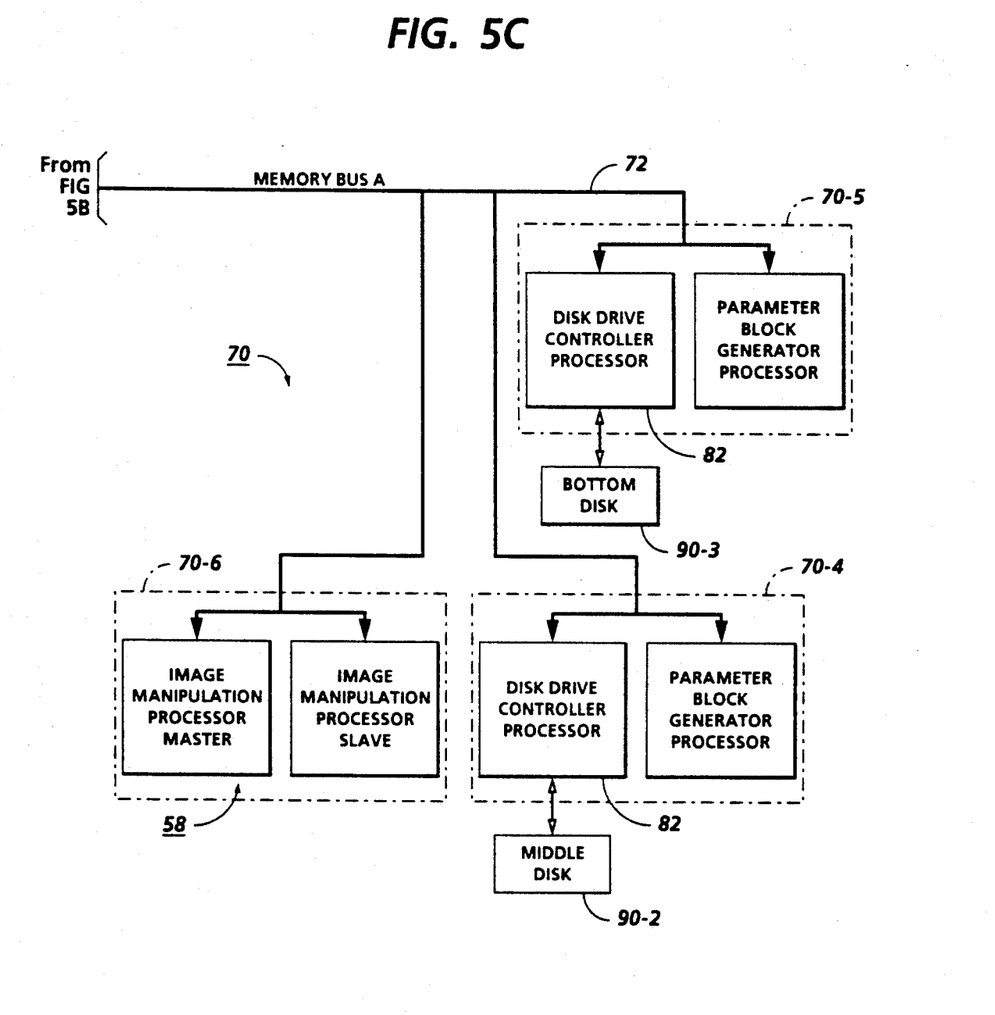

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touch screen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touch screen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having system processors 78; low speed I/O processor PWB 70-2 having UI communication controller 80 for transmitting data to and from UI 52; PWBs 70-3, 70-4, 70-5 having disk drive controller/- processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
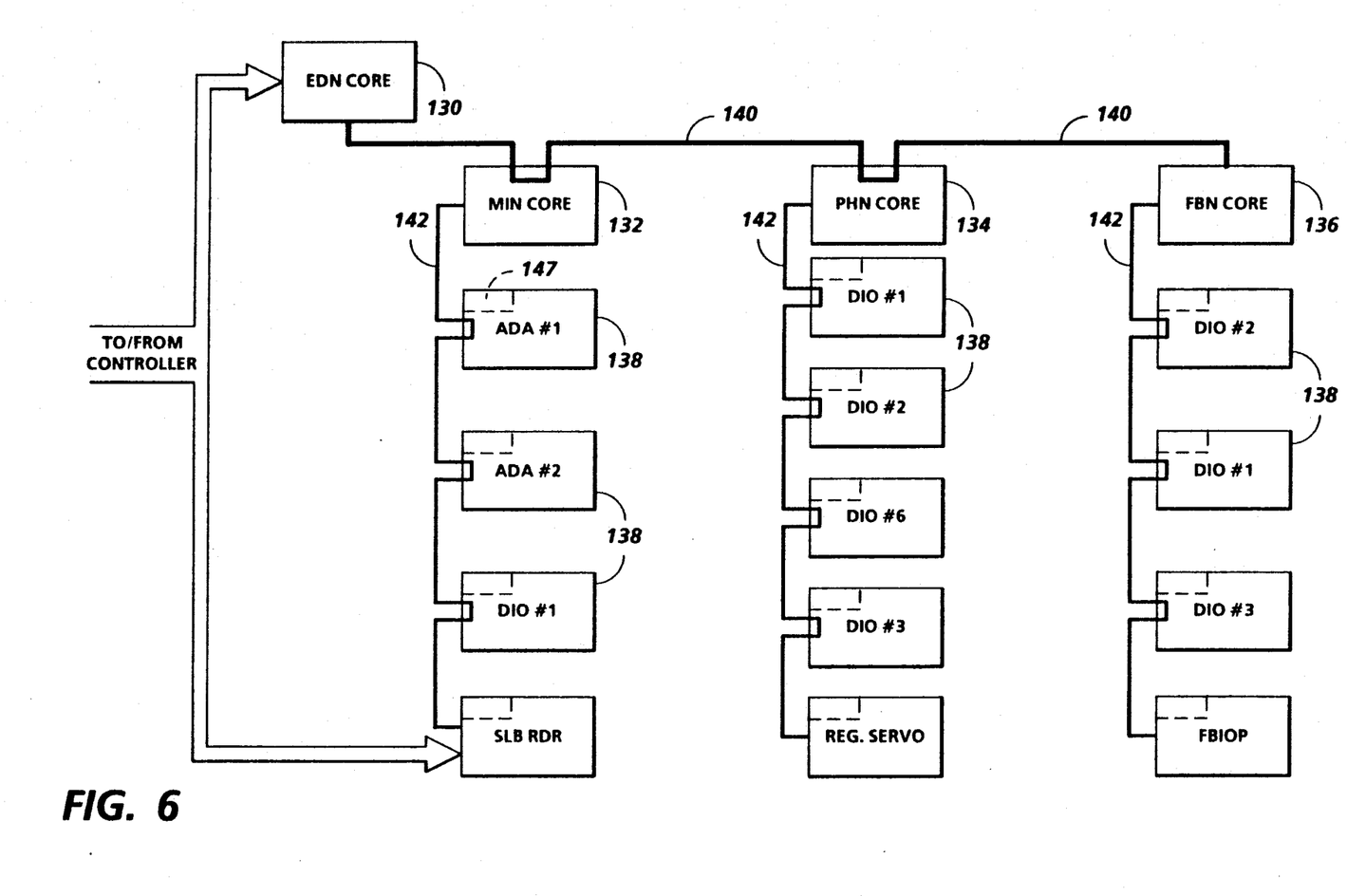
FIG. 6 is a block diagram depicting the Operating System, with Printed Wiring Boards and shared line connections.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Data from the three disks, 90-1, 90-2, and 90-3 is retrieved in parallel to provide the maximum bandwidth from the disks 56 to systems memory 61 to printer 8. Each of the disks stores a portion of the information needed in parallel with the information from the other disks for satisfactory printing. If one of the disks does not retrieve the information fast enough, the information required to be printed will be incomplete when the printer 8 requested it, that is, the data will not be available when expected by the printer. In accordance with the present invention, the timing is verified by a service representative under a diagnostic routine to determine the relative speed or time period of retrieval of data by each of the drives of the disks 90-1, 90-2, and 90-3. In a specific embodiment, each of the drives is timed on the length of time to track or read 500 pages of data on each of the respective disks 90-1, 90-2, and 90-3. It should also be understood that the verification of the timing could be an automatic procedure executed periodically during the operation of the printing machine resulting in suitable messages or fault codes being displayed to the operator at touchscreen 62 and the scope of the invention is intended to cover any suitable manner of testing and manifesting the relative speed of a plurality of memory drives.

In general, the process of verification of disk retrieval time includes generating random locations for each of the drives to track or read such selected locations from the disks. The random locations are common to each of the drives and, preferably, at least one of the locations is the extreme distal location from the starting position of the drive. Each of the disk drives, of course, must be initialized to the common starting position. There is then a recording of the time that each of the disk drives initiates a track or read operation to locate each of the random locations, followed by a recording of the time that each of the disk drives actually reads all of the random locations. The difference in the two times is the time period for each of the drives to find and read the random locations. Each of the time periods is compared to a given threshold value to determine if any of the disk drives is operating at an unsatisfactory manner. A typical unsatisfactory performance is that one of the drives is running at a relatively slower speed than the other two drives resulting in abnormal printing operations. A fault is declared and displayed upon the detection of any of the time periods deviating from the threshold.

Figures 7, 8:
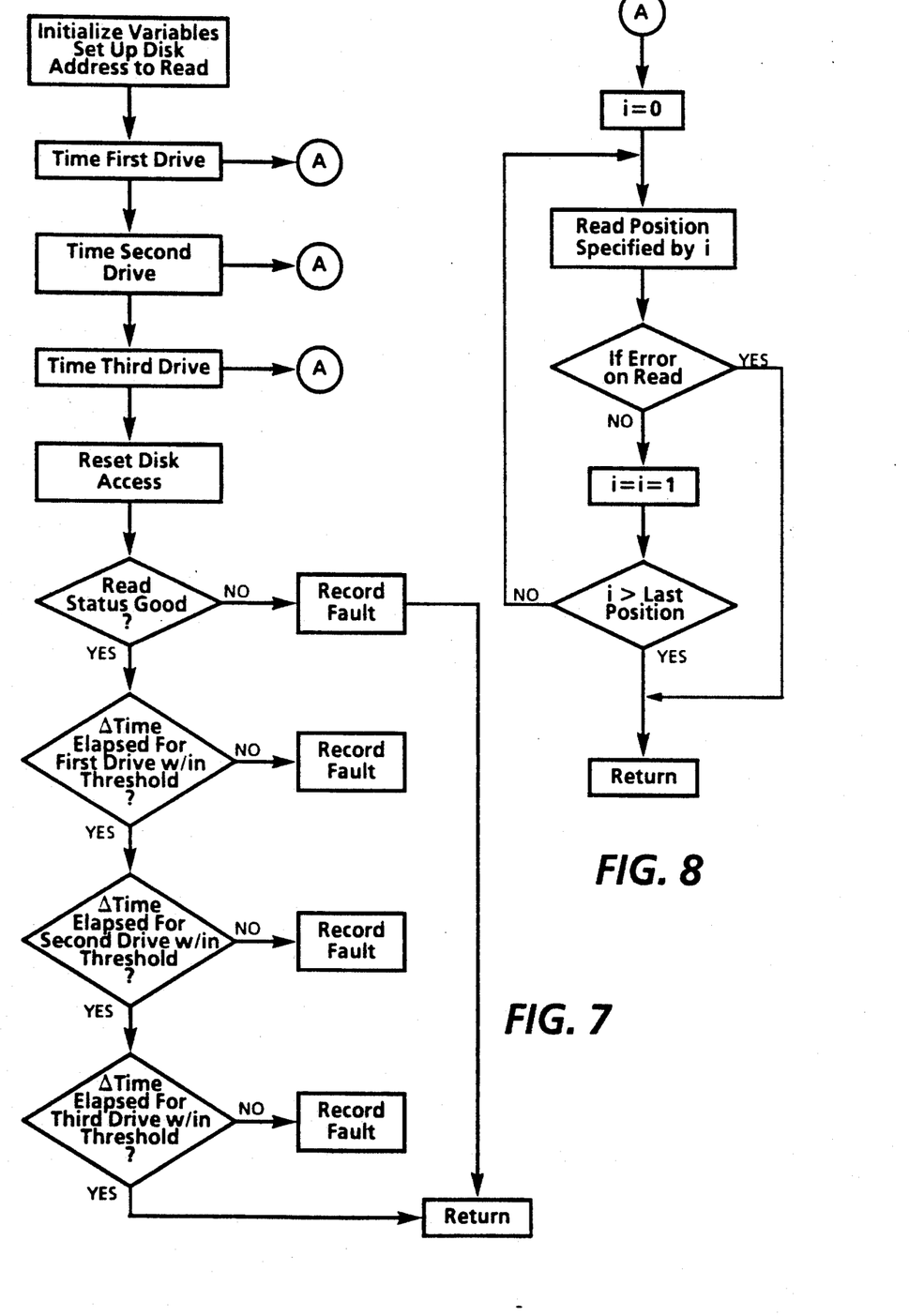
FIGS. 7 and 8 are flow charts of the diagnostic timing test in accordance with the present invention.

With reference to FIG. 7, in accordance with the present invention, the first step in the disk drive testing procedure is to initialize the variables. That is, all the variables are set to zero. Preferably, there is a set up table of 500 randomly generated disk addresses. These addresses are good pages on the particular disk that is being tested. The next step, as illustrated in FIG. 7, is to time the first disk drive. That is accomplished by initially reading a clock and then calling a sub-routine operation to read each of the 500 disk addresses for the first drive.

The sub-routine is illustrated in FIG. 8. Specifically, the sub-routine procedure loops through the list of addresses and reads the information at the particular locations. If an error should occur, as shown by the "if error on read" decision block, the loop is exited and an error flag is set. Upon return to the flow chart of FIG. 7, either after the recognition of an error or after cycling through the 500 disk addresses, the elapsed time for the drive to read the 500 disk addresses is calculated and stored in a suitable memory location.

Following the determination of the elapsed time for the first disk drive, the access time of the second disk drive is determined. Again there is a read of a local clock and a call to the sub-routine operation illustrated in FIG. 8 to read each of the same 500 disk addresses for the second drive. Upon completion of the accessing of the 500 disk addresses, assume no error has been uncovered, the elapsed time for the accessing of the 500 disk addresses is calculated for the second drive. The same procedure is then done for the third drive, cycling through the same 500 disk addresses for the third disk drive and a calculation of the access time. There is then a "read status good" operation to verify that the timing tests were executed without error. There are then three comparative tests performed. The first comparative test checks the difference of time elapsed for the first drive against the second and third drives to be within a given threshold. It should be understood that any suitable threshold value for the type of disk drives and tests required is possible. In a specific embodiment, a threshold of 16600 micro seconds has been used.

There is then a check of the difference in elapsed time for the second drive against the first and third drives to determine if the second drive is within the same threshold. And finally there is a check of the difference in elapsed time of the third drive against the first and second drives to be within the same threshold also. If all three tests result in a deviation value within the threshold, no fault is declared. If any of the test results in a deviation exceeding the threshold, an error flag is set and fault code suitably displayed.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. A process for testing the disk drives of an electronic printing machine having a scanning means and for scanning in the information that comprises each print job to each of the disks being controlled, and retrieving the information from the plurality of disks to the system memory for making prints, comprising the steps of:
   a) generating random locations for each of the drives to seek, at least one of the locations being the extreme location from the position of the drive, the random locations being common to each of the drives;
   b) initializing each of the disk drives to a common position;
   c) recording the time of each of the disk drives initiating a find operation to locate each of the random locations and recording the time of each of the disk drives finding and reading all of the random locations to determine the time period for each of the drives to find and read the random locations;
   d) comparing each of the time periods to a given range of acceptable time periods; and
   e) declaring a fault upon detecting any of the time periods deviating from the range of acceptable time periods.

2. A process for testing the memory drives of an electronic printing machine having scanning means for scanning in the information that comprises each print job to the memory being controlled by a plurality of memory drives, and retrieving the information from the memory for making prints, comprising the steps of:
   a) generating random locations for each of the drives to seek;
   b) initializing each of the drives to a common position;
   c) determining the time period for each of the drives to find and read the random locations;
   d) comparing each of the time periods to a threshold value; and
   e) declaring a fault upon detecting any of the time periods deviating from said threshold.

3. The process of claim 2 wherein one of the random locations is the maximum distance form the starting point of the drive.

4. The process of claim 2 including the step; of displaying a fault code upon detecting any of the time periods deviating from said threshold.

5. The process of claim 4 including the step of identifying a particular memory drive deviating from said threshold.

6. A process for testing the memory drives of an electronic printing machine having means for capturing the information that comprises each print job to the memory, the memory being controlled by a plurality of memory drives, and retrieving the information from the memory for making prints, comprising the steps of:
   a) generating random locations for each of the drives to seek;
   b) initializing each of the drives to a common position;
   c) determining the time period for each of the drives to find and read the random locations;
   d) comparing each of the time periods to a threshold value;
   e) manifesting a fault upon detecting any of the time periods deviating from said threshold including the step of displaying a fault code upon detecting any of the time periods deviating from said threshold, and
   f) identifying a particular memory drive deviating from said threshold.

7. A process for testing the disk drives of an electronic printing machine comprising the steps of:
   a) generating random locations for each of the drives to find;
   b) initializing each of the drives to a common position;
   c) determining the time period for each of the drives to find the random locations; and
   d) declaring a fault upon detecting any of the time periods deviating from a threshold.

8. A process for testing the disk drives of an electronic printing machine having a system memory and means for reading the information that comprises each print job to each of the disks being controlled by a disk drive via the system memory, and retrieving the information from the plurality of disks to the system memory for making prints, comprising the steps of:
   a) generating random locations for each of the drives to seek, at least one of the locations being the extreme location from the position of the drive, the random locations being common to each of the drives;
   b) initializing each of the disk drives to a common position;
   c) recording the time of each of the disk drives initiating a find operation to locate each of the random locations and recording the time of each of the disk drives finding and reading all of the random locations to determine the time period for each of the drives to find and read the random locations;
   d) comparing each of the time periods to a given range of acceptable time periods; and
   e) declaring a fault upon detecting any of the time periods deviating from the range of acceptable time periods.

9. The process of claim 8 including the step of displaying a fault code upon detecting any of the time periods deviating from said range.

10. The process of claim 9 including the step of identifying a particular memory drive deviating from said range.

11. A process for testing the memory drives of an electronic printing machine comprising the steps of:
   a) generating random locations for each of the drives to find;
   b) initializing each of the drives to a common position;
   c) determining the time period for each of the drives to find the random locations; and
   e) declaring a fault upon detecting any of the time periods deviating from a threshold.

12. A method for testing and comparing the access times of disk drives in a real time system containing a multiplicity of like drives including the steps of generating random locations for each of the drives to access, initializing each of the drives to a common position, determining the time period for each of the drives to find and read the random locations, comparing the differences in the time periods to a threshold value, and declaring a fault upon detecting any of the differences exceeding the said threshold.

* * * * *